(12) United States Patent  
Carpenter

(10) Patent No.: US 11,268,710 B2  
(45) Date of Patent: *Mar. 8, 2022

(54) DISPLACEMENT VENTILATION SYSTEMS FOR ENCLOSED SPACES

(71) Applicant: David J. Carpenter, Santa Rosa, CA (US)

(72) Inventor: David J. Carpenter, Santa Rosa, CA (US)

( * ) Notice: Subject to any disclaimer, the term of this patent is extended or adjusted under 35 U.S.C. 154(b) by 480 days.

This patent is subject to a terminal disclaimer.

(21) Appl. No.: 15/852,981

(22) Filed: Dec. 22, 2017

(65) Prior Publication Data

US 2018/0156481 A1 Jun. 7, 2018

Related U.S. Application Data

(63) Continuation-in-part of application No. 12/718,875, filed on Mar. 5, 2010, now Pat. No. 9,851,116.

(Continued)

(51) Int. Cl.
*F24F 7/08* (2006.01)
*F24F 11/00* (2018.01)
(Continued)

(52) U.S. Cl.
CPC .......... *F24F 7/08* (2013.01); *F24F 11/0001* (2013.01); *F24F 12/006* (2013.01);
(Continued)

(58) Field of Classification Search
CPC combination set(s) only.
See application file for complete search history.

(56) References Cited

U.S. PATENT DOCUMENTS 3,417,577 A * 12/1968 Waldron ............... F24F 7/065
62/263
3,482,503 A * 12/1969 Jenn .................... F24F 7/06
454/228

(Continued)

FOREIGN PATENT DOCUMENTS

WO 1991014905 10/1991
WO 2005114059 12/2005

OTHER PUBLICATIONS

Morton H. Blatt, "Advanced HVAC Systems for Improving Indoor Environmental Quality and Energy Performance of California K-12 Schools," California Energy Commission, May 2006, 18 pages.

*Primary Examiner* — Steven B McAllister
*Assistant Examiner* — Elizabeth M. May
(74) *Attorney, Agent, or Firm* — Doherty IP Law Group LLC

(57) ABSTRACT

A displacement ventilation system for a room includes a first duct located inside the room and extending between a floor and a ceiling of the room, an air inlet coupled with the first duct for drawing air into the system, and an elongated diffuser extending adjacent the floor for diffusing at least some of the outside air over the floor of the enclosed spaced. The system includes a return air duct extending adjacent the ceiling and being coupled with the first duct for removing return air from the room and advancing the return air toward the first duct, a heat exchanger for transferring thermal energy between the return air and the outside air, and a heat pump for changing a temperature level of the outside air or the return air passing through the heat pump. The system includes sensors located inside the room, and a controller for controlling operation of the system. The controller is in communication with the sensors.

21 Claims, 9 Drawing Sheets

Related U.S. Application Data

(60) Provisional application No. 61/291,770, filed on Dec. 31, 2009.

(51) Int. Cl.
| | | |
|---|---|---|
| *F24F 12/00* | (2006.01) | |
| *F24F 13/072* | (2006.01) | |
| *F24F 130/40* | (2018.01) | |
| *F24F 110/50* | (2018.01) | |
| *F24F 120/10* | (2018.01) | |
| *F24F 110/10* | (2018.01) | |
| *F24F 13/24* | (2006.01) | |
| *F24F 110/20* | (2018.01) | |
| *F24F 8/22* | (2021.01) | |

(52) U.S. Cl.
CPC ............. *F24F 13/072* (2013.01); *F24F 8/22* (2021.01); *F24F 13/24* (2013.01); *F24F 2011/0002* (2013.01); *F24F 2110/10* (2018.01); *F24F 2110/20* (2018.01); *F24F 2110/50* (2018.01); *F24F 2120/10* (2018.01); *F24F 2130/40* (2018.01); *F24F 2221/40* (2013.01); *Y02B 30/56* (2013.01)

(56) References Cited

U.S. PATENT DOCUMENTS

| | | | | |
|---|---|---|---|---|
| 4,370,155 | A * | 1/1983 | Armbruster | F24F 7/065 |
| | | | | 96/140 |
| 4,497,362 | A * | 2/1985 | Teague, Jr. | F24F 12/001 |
| | | | | 165/54 |
| 4,582,164 | A * | 4/1986 | Schreiner | F16L 9/21 |
| | | | | 181/224 |
| 4,688,626 | A | 8/1987 | Tengesdahl | |
| 4,711,162 | A | 12/1987 | Eriksson | |
| 5,108,469 | A | 4/1992 | Christ | |
| 5,225,167 | A * | 7/1993 | Wetzel | A61L 9/20 |
| | | | | 96/224 |
| 5,412,882 | A | 5/1995 | Zippe | |
| 5,938,523 | A * | 8/1999 | Khelifa | B60H 3/0633 |
| | | | | 454/156 |
| 5,983,890 | A | 11/1999 | Thomas | |
| 6,033,303 | A | 3/2000 | Green | |
| 6,132,310 | A | 10/2000 | Baribeault et al. | |
| 6,899,615 | B2 * | 5/2005 | Gebke | B01D 46/008 |
| | | | | 454/306 |
| 7,013,969 | B1 | 3/2006 | Loudermilk | |
| 7,364,094 | B2 | 4/2008 | Bagwell et al. | |
| 9,851,116 | B2 | 12/2017 | Carpenter | |
| 2002/0183001 | A1 | 12/2002 | Holter | |
| 2003/0172919 | A1 | 9/2003 | Rabas | |
| 2003/0177777 | A1 * | 9/2003 | Brumett | F24F 3/153 |
| | | | | 62/264 |
| 2004/0147217 | A1 * | 7/2004 | Peterson | F24F 3/16 |
| | | | | 454/230 |
| 2005/0236013 | A1 * | 10/2005 | Huston | B63J 2/04 |
| | | | | 134/1 |
| 2006/0117769 | A1 * | 6/2006 | Helt | F24F 11/0001 |
| | | | | 62/161 |
| 2008/0076346 | A1 * | 3/2008 | Ahmed | F24F 11/30 |
| | | | | 454/256 |
| 2008/0207109 | A1 | 8/2008 | Bagwell et al. | |

* cited by examiner

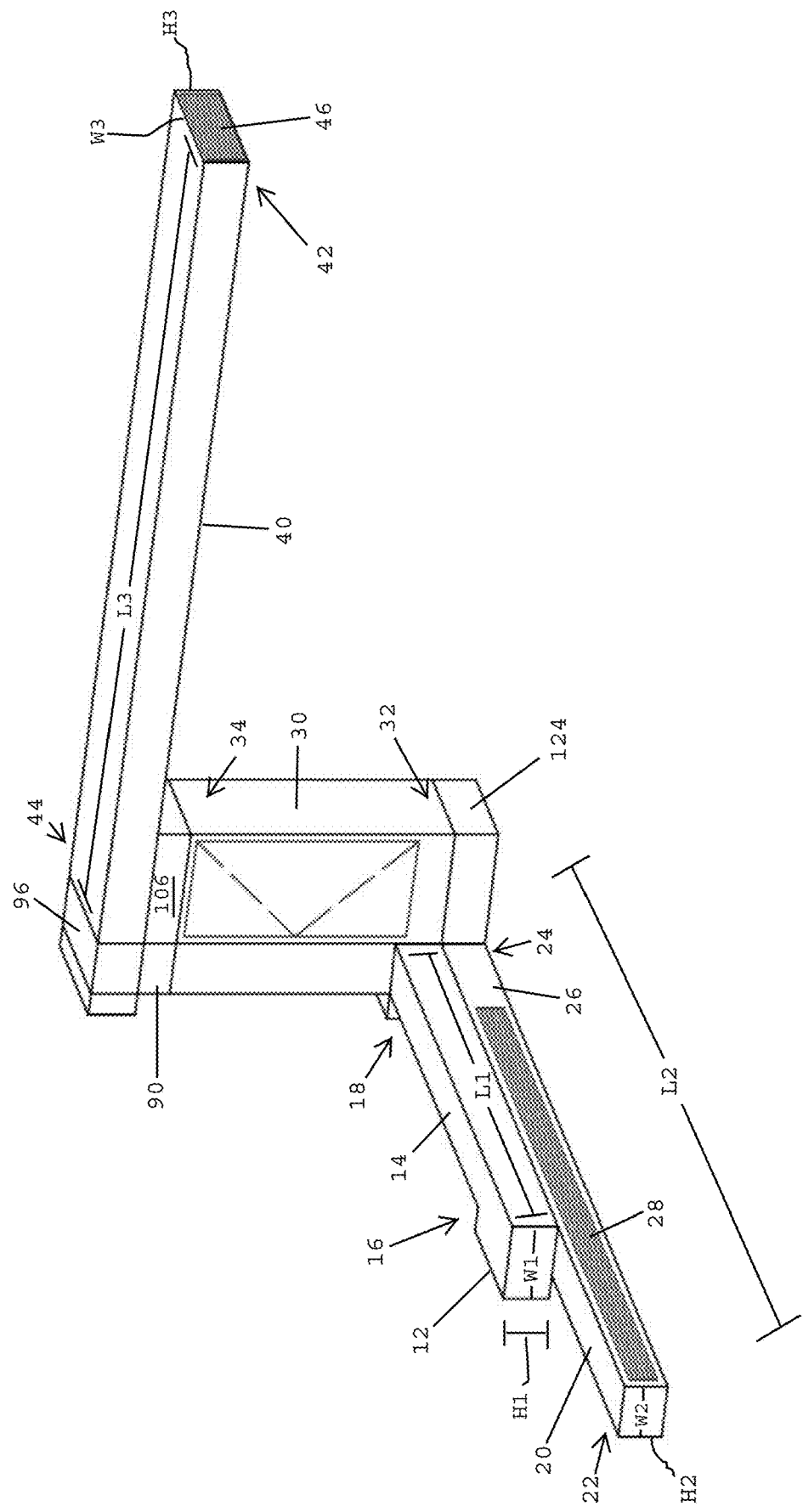

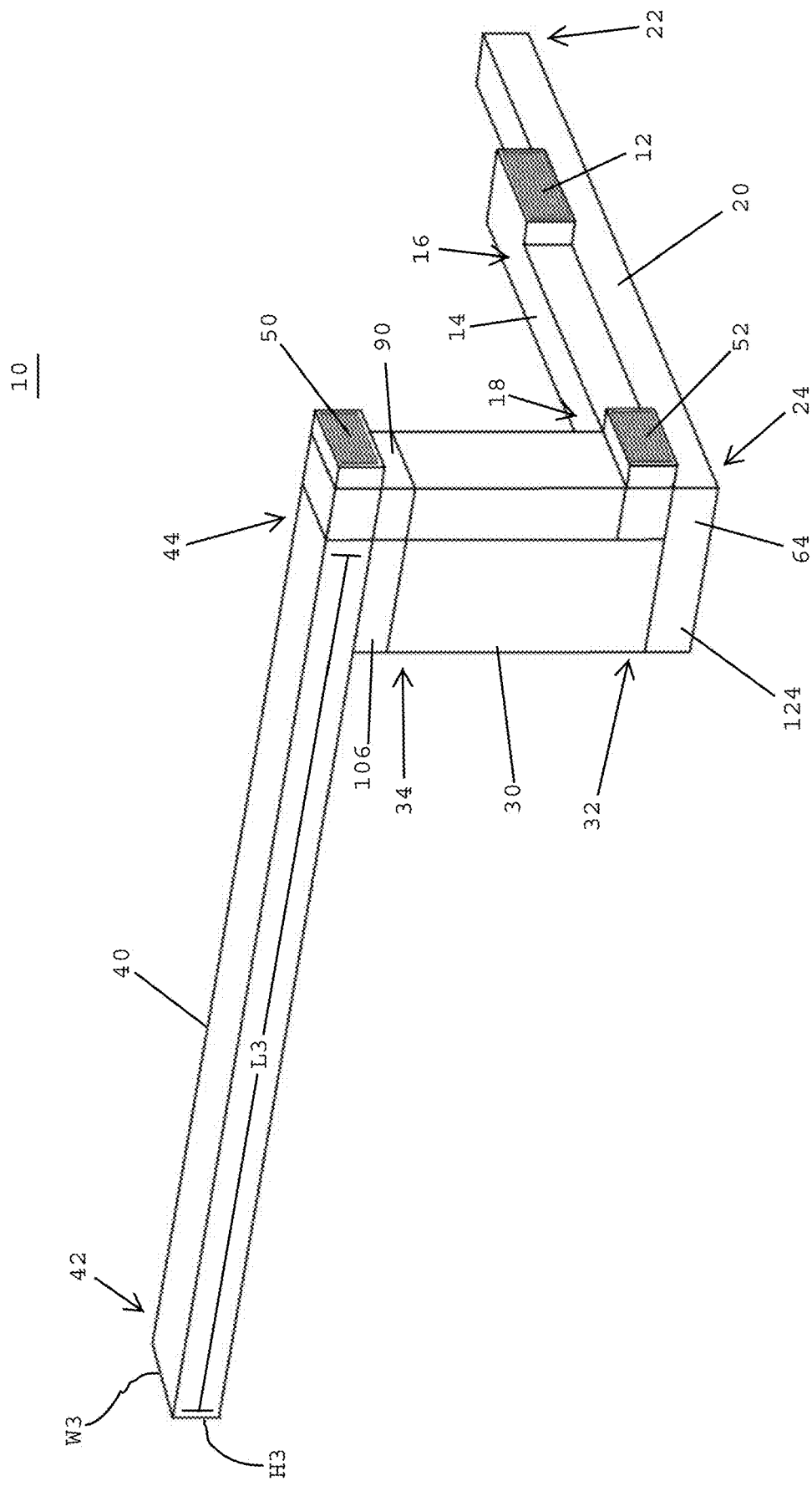

DISPLACEMENT VENTILATION SYSTEMS FOR ENCLOSED SPACES

CROSS REFERENCE TO RELATED APPLICATIONS

The present patent application is a continuation-in-part of U.S. patent application Ser. No. 12/718,875, filed Mar. 5, 2010, now allowed, which claims the benefit of U.S. Provisional Application Ser. No. 61/291,770, filed Dec. 31, 2009, the disclosures of which are hereby incorporated by reference herein.

BACKGROUND OF THE INVENTION

Field of the Invention

The present invention relates to ventilation systems for buildings and more specifically relates to displacement ventilation systems for buildings such as school building, office building, auditoriums, and theatres.

Description of the Related Art

Many studies have shown that poor environments in enclosed spaces, which are primarily due to the effects of indoor pollutants, adversely affect the health, attendance, and performance of room occupants. Moreover, it has been determined that there is a direct link between high concentrations of particular air pollutants and reduced attendance levels. Poor environments may also increase microbiological pollutants associated with higher incidences of asthma and respiratory infections.

Many buildings are ventilated, heated and/or cooled using mixed ventilation systems. Although somewhat effective, mixed ventilation systems typically have a number of problems associated therewith including poor air quality, excessive noise, and lower comfort levels, which may adversely affect the performance levels of individuals occupying a building. These negative factors are particularly problematic when mixed ventilation systems are utilized in school environments, where use of these systems has been shown to adversely the health, performance and attendance of students and teachers.

An alternative ventilation methodology, commonly referred to as displacement ventilation, provides an economical means of delivering a supply of fresh air directly to the occupants of an enclosed space so as to improve the quality of the indoor air environment. In displacement ventilation system, outside air is introduced into a room near the floor and at a relatively low velocity. As the air spreads across the room it contacts one or more heat sources such as room occupants or equipment, and the air rises as it picks up heat from the heat sources located in the room. The warm air that is present in the room ascends in a vertical direction toward the ceiling where it enters a return air duct for being exhausted from the room. Because the incoming supply of air follows a vertical air flow pattern near each occupant, it is less likely that germs will spread horizontally across the room.

In spite of the above advances, there remains a need for improved displacement ventilation systems that improve air quality, minimize noise, reduce costs, and may be readily placed in existing buildings.

SUMMARY OF THE INVENTION

In one embodiment, a displacement ventilation system provides a number of advantages over conventional ventilation systems. First, the displacement ventilation system delivers greater volumes of fresh air to the occupants of a room, minimizes noise, minimizes energy use, and increases occupant comfort. In one embodiment, a displacement ventilation system produces healthier surroundings resulting in improved health, lower absentee rates, and better productivity for occupants.

Although the present invention is not limited by any particular theory of operation, it is believed that the quality of the air located within an enclosed space supplied by the displacement ventilation systems disclosed herein may be improved due to rising thermal plumes that carry contaminants and pollutants away from occupants and toward a ceiling exhaust. The vertically moving air patterns preferably inhibit the transfer of pollutants from one occupant to another. Thus, the displacement ventilation systems disclosed herein provide better pollutant removal and enhanced indoor air quality than may be achieved when using conventional systems such as mixed ventilation systems.

In one embodiment, a displacement ventilation system also provides improved acoustics because air passing through the system flows at a lower velocity than is found in conventional ventilation systems. In particular, the low velocity of the air leaving a linear diffuser is relatively quiet compared to the noisy, in-rush of air often experienced when using mixed ventilation systems. As such, it is easier to satisfy building acoustic standards, and the systems will not have to be shut down so that occupants can hear one another.

In one embodiment, a displacement ventilation system includes a vertical duct located inside an enclosed space and extending between a floor and a ceiling of the enclosed space, an air inlet coupled with the vertical duct for drawing air from outside the enclosed space and into the displacement ventilation system, and an elongated diffuser extending adjacent the floor of the enclosed space and being coupled with the vertical duct for diffusing at least some of the outside air over the floor of the enclosed space. In one embodiment, the displacement ventilation system preferably includes a return air duct extending adjacent the ceiling of the enclosed space and being coupled with the vertical duct for removing return air located near the ceiling from the enclosed space and advancing the return air toward the vertical duct. In one embodiment, the system desirably includes a heat exchanger located between the air inlet and the return air duct for transferring thermal energy between the return air and the outside air. The system also preferably includes a heat pump located between the air inlet and the elongated diffuser for changing the temperature level of the outside air and/or the return air passing through the heat pump. In one embodiment, the displacement ventilation system also desirably includes an air inlet duct having an upstream end and a downstream end, whereby the air inlet is connected to the upstream end of the air inlet duct and the downstream end of the air inlet is coupled with the vertical duct. In one embodiment, the air inlet duct desirably has a length of about 12-18 feet, a height of about 6-18 inches, and a width of about 18-36 inches.

In one embodiment, the elongated diffuser desirably includes a diffuser duct having an upstream end coupled with the vertical duct, a downstream end remote from the upstream end, and an inner face extending along the length of the diffuser duct. In one embodiment, the inner face of the duct preferably includes a plurality of openings configured in an elongated array that extends over the floor of the enclosed space. In one embodiment, the inner face preferably includes a horizontally-extending, elongated porous diffusion plate having a plurality of openings adapted for diffusing the air over the floor of the enclosed space. In one embodiment, the diffuser duct has a length of about 20-25 feet, a height of about 6-18 inches, and a width of 18-36 inches. In one embodiment, the horizontally-extending, elongated porous diffusion plate of the diffuser duct desirable has a length of about 18-22 feet. The lower edge of the diffusion plate is preferably about less than six inches, more preferably less than three inches, and even more preferably less than one inch above the top surface of the floor of the enclosed space.

In one embodiment, the diffuser duct preferably overlies the floor of the enclosed space and the air inlet duct overlies the diffuser duct. In one embodiment, the diffuser duct is preferably longer than the air inlet duct.

In one embodiment, the return air duct desirably includes an upstream end including a return air inlet for drawing the return air into the return air duct, and a downstream end overlying the vertical duct of the system. The displacement ventilation system may also include a first return air outlet aligned with the downstream end of the return air duct for exhausting the return air from the enclosed space. In one embodiment, the displacement ventilation system may include a second return air outlet positioned adjacent a lower end of the vertical duct for exhausting the return air from the enclosed space after the return air has passed through the heat exchanger.

In one embodiment, a displacement ventilation system preferably includes a variable speed fan for driving air through the displacement ventilation system, and a controller coupled with the variable speed fan and the heat pump for controlling operation of the displacement ventilation system. The controller may be coupled with one or more sensors that monitor the air quality, temperature, and/or humidity of the air within an enclosed space. The one or more sensors may also include a motion detector for detecting when occupants are present in the enclosed space. The system controller may be activated and/or operated in response to the information received from the one or more sensors.

In one embodiment, a displacement ventilation system preferably includes a damper system having a plurality of movable dampers for directing the flow of the outside air and the inside air through the displacement ventilation system. In one embodiment, the damper system includes a first state in which the one or more dampers direct the outside air through the heat exchanger and the heat pump for being diffused across the floor of the enclosed space, and the one or more dampers direct the return air through the first return air outlet for exhausting the return air from the system. The damper system desirably includes a second state in which the one or more dampers direct the outside air through a first section of the heat exchanger and the return air through a second section of the heat exchanger for transferring thermal energy between the outside air and the return air and for exhausting the return air to the outside through the second return air outlet. The damper system may also include a third state in which the one or more dampers direct the outside air through a first section of the heat exchanger and the heat pump, and the return air through the heat pump for mixing with the outside air.

In one embodiment, the heat exchanger preferably has an intake side having a titanium oxide or titanium dioxide coating for neutralizing pollutants and an exhaust side having a copper oxide coating for disinfecting microbes and improving thermal energy transfer. In one embodiment, at least one of the ducts of the displacement ventilation system may be lined with an acoustic liner for minimizing noise transmission.

In one embodiment, the air inlet preferably includes one or more louvers movable between an open position and a closed position for controlling the flow of the outside air into the displacement control system. The first and second return air outlets may also be covered by louvers movable between open and closed positions.

In one embodiment, a displacement ventilation system preferably includes an air inlet duct for drawing outside air into the displacement ventilation system, a diffuser duct extending over a floor of an enclosed space for diffusing at least some of the outside air over the floor, and a return air duct extending under a ceiling of the enclosed space for removing return air located near the ceiling from the enclosed space. In one embodiment, the displacement ventilation system preferably includes a heat exchanger located between the air inlet duct and the return air duct for transferring thermal energy between the return air and the outside air, and a heat pump located between the air inlet duct and the diffuser duct for changing a temperature level of the outside air and the return air passing therethrough. In one embodiment, the displacement ventilation system preferably includes a variable speed fan for controlling the speed at which the outside air and the inside air flow through the displacement ventilation system, and a controller coupled with the variable speed fan and the heat pump for controlling operation of the displacement ventilation system.

In one embodiment, the heat exchanger has a first flow path extending therethrough having a titanium oxide or titanium dioxide coating for neutralizing pollutants and a second flow path extending therethough having a copper oxide coating for disinfecting microbes and improving thermal energy transfer. In one embodiment, the air flow through the system is adjustable upon initial installation and/or after installation to maximize the efficiency of heat transfer in response to climate conditions. In one embodiment, the system is adjustable, such as by using dampers, so that the outside air is directable into one of the first and second flow paths depending upon outside air temperatures with the return air being directed into the other one of the flow first and second flow paths.

In one embodiment, the heat exchanger includes a plurality of outside air cells extending through the heat exchanger for directing the outside air from a first end to a second end of the heat exchanger, whereby each of the outside air cells preferably has an inlet adjacent the first end of the heat exchanger and an outlet adjacent the second end of the heat exchanger. The heat exchanger preferably includes a plurality of return air cells extending through the heat exchanger for directing the return air from the second end to the first end of the heat exchanger, whereby each of the return air cells has an inlet adjacent the second end of the heat exchanger and an outlet adjacent the first end of the heat exchanger, and whereby at least some of the outside air cells extending through the heat exchanger are in thermal communication with at least some of the return air cells extending through the heat exchanger for transferring thermal energy between the outside air and the return air.

In one embodiment, at least one of the outside air cells is desirably sandwiched between at least two of the return air cells, and at least one of the return air cells is desirably sandwiched between at least two of the outside air cells.

In one embodiment, the system preferably includes a first duct coupler adjacent the first end of the heat exchanger. The first duct coupler desirably includes a first section in fluid communication with the inlets of the plurality of outside air cells for directing the outside air into each of the plurality of outside air cells, a second section in fluid communication with the outlets of the plurality of return air cells for receiving the return air from each of the return air cells, and a first permeable membrane extending between the first and second sections of the first duct coupler for transferring latent heat between the return air leaving the second end of the heat exchanger and the outside air entering the first end of the heat exchanger.

In one embodiment, the system preferably includes a second duct coupler adjacent the second end of the heat exchanger. The second duct coupler desirably includes a first section in fluid communication with the outlets of the plurality of outside air cells for receiving the outside air from each of the plurality of outside air cells, a second section in fluid communication with the inlets of the plurality of return air cells for directing the return air into each of the plurality of return air cells, and a second permeable membrane extending between the first and second sections of the second duct coupler for transferring latent heat between the return air entering the second end of the heat exchanger and the outside leaving the second end of the heat exchanger.

In one embodiment, a displacement ventilation system saves energy costs. In temperate environments, there are thousands of hours annually when the outside temperature is between 55-65° Fahrenheit, which greatly increases the potential for free cooling of enclosed spaces. The higher inlet air temperatures (e.g. 55-65° Fahrenheit) also increases the efficiency of mechanical cooling equipment because less "lift" or work is required by a compressor to raise the refrigerant pressure and temperature before it reaches the condenser. In addition, because the air near the ceiling is warmer when it is exhausted, the displacement ventilation systems of the present invention reduce cooling coil loads. Much of the heat in the upper part of an enclosed space never enters the occupied zone and thus does not have to be removed by the cooling system. All of the above described benefits contribute to energy savings.

In one embodiment, the displacement ventilation system preferably includes one or more ultraviolet lights that are designed to function as a photocatalyst to accelerate the oxidation process provided by the titanium oxide, titanium dioxide, copper oxide and/or silver oxide coatings for neutralizing pollutants, disinfecting microbes, and/or improving thermal energy transfer.

In one embodiment, the heat exchanger preferably includes one or more ultraviolet lights that are adapted to accelerate the oxidation process for decomposing any air borne pollutants or toxic matter present in at least one of said first and second flow paths.

These and other preferred embodiments of the present invention will be described in more detail below.

BRIEF DESCRIPTION OF THE DRAWING

FIG. 1A shows a front perspective view of a displacement ventilation system, in accordance with one embodiment of the present invention.

FIG. 1B shows a rear perspective view of the displacement ventilation system shown in FIG. 1B.

DETAILED DESCRIPTION

Figure 2:
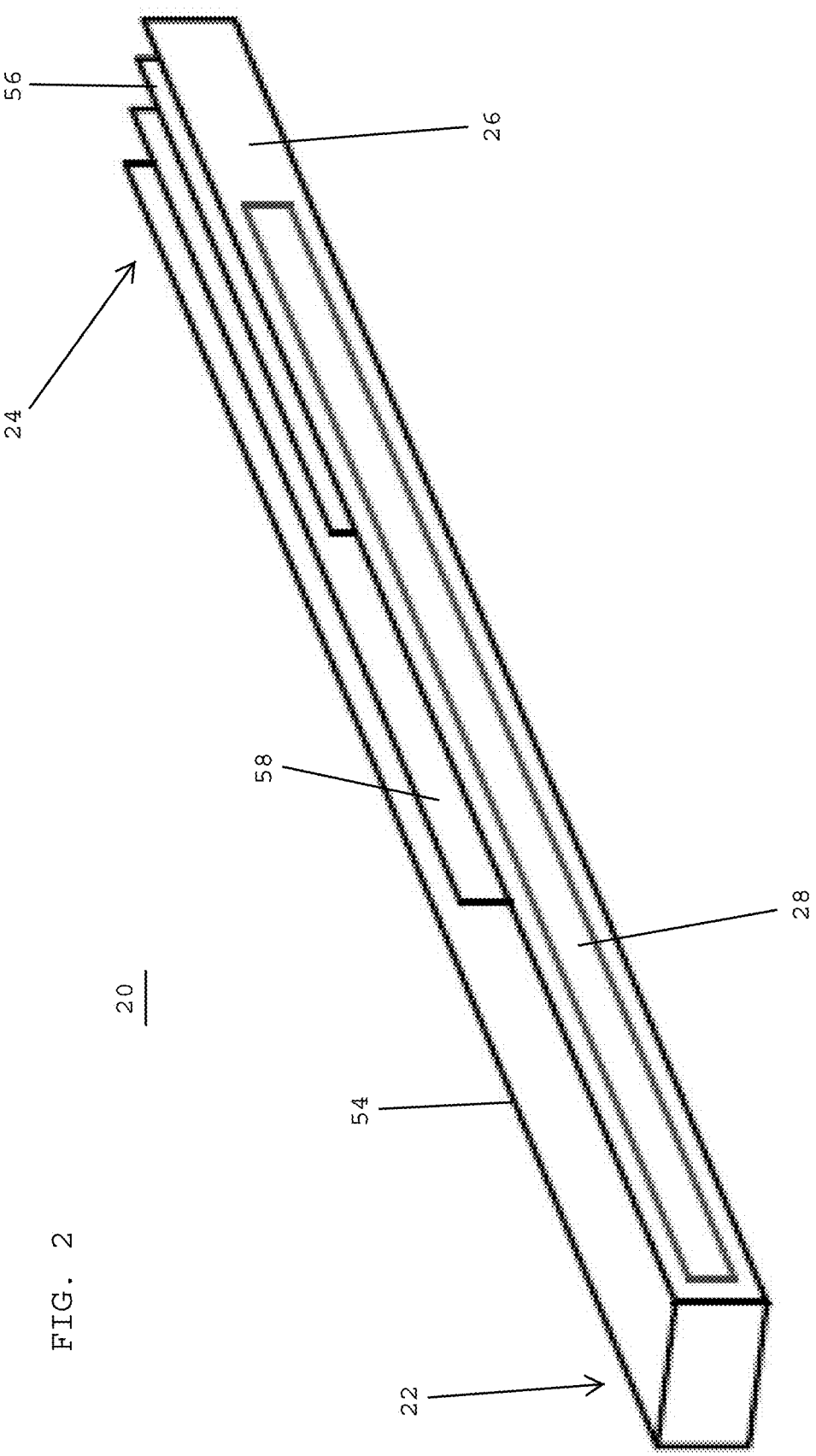
FIG. 2 shows a linear diffuser having internal flow control partitions for the displacement ventilation system shown in FIGS. 1A and 1B.

Referring to FIGS. 1A and 1B, in one embodiment, a displacement ventilation system 10 for ventilating, heating and/or cooling an enclosed space, such as a room within a building, preferably includes an air inlet 12 for supplying outside air to an air inlet duct 14. The air inlet duct 14 preferably has an upstream end 16 adjacent the air inlet 12 and a downstream end 18 remote therefrom. As used herein, the terminology "upstream" and "downstream" indicate the direction of flow of air through the displacement ventilation system of the present application. In one embodiment, the air will flow from the "upstream" region to the "downstream" region. In one embodiment, the air inlet duct 14 preferably extends horizontally over a floor of an enclosed space. In one embodiment, the air inlet duct 14 has a length $L_1$ of between about 12-16 feet, a height $H_1$ of between about 6-18 inches, and a width $W_1$ of between about 18-36 inches. The relatively large dimensions noted above, in comparison to conventional ventilation systems, enables air to flow through the system at a lower velocity, which preferably provides a number of benefits including minimizing noise generated by the displacement ventilation system and reducing energy costs associated with operating the system. In one embodiment, the air inlet 12 preferably includes one or more louvers (not shown) that are movable between an open position for allowing outside air to enter the air inlet duct 14 and a closed position for preventing outside air from entering the air inlet duct 14. In one embodiment, the one or more louvers may be open when the outside air is cooler than the inside air and it is desirable to lower the temperature inside an enclosed space. In one embodiment, the one or more louvers may be closed when the inside air is warmer than the outside air and it is desired to maintain the heat level within the enclosed space or increase the heat level within the enclosed space.

In one embodiment, the displacement ventilation system 10 preferably includes a diffuser duct 20 that extends below the air inlet duct 14. The diffuser duct 20 preferably includes a downstream end 22 and an upstream end 24 remote therefrom. The diffuser duct 20 also preferably includes an inner face 26 having a linear diffuser plate 28 that extends at least partially along the length of the diffuser duct. In one embodiment, the linear diffuser plate preferably includes a plurality of openings or apertures extending therethrough that enables the air to be diffused through the plate and over a floor surface of an enclosed space. The linear diffuser plate 28 preferably extends in a longitudinal direction along the length of the diffuser duct. In one embodiment, the linear diffuser plate 28 extends adjacent a top surface of a floor. In one embodiment, spacing between a bottom edge of the linear diffuser plate and the top surface of a floor is less than six inches, more preferably less than three inches, and even more preferably less than one inch. The relatively small distance between the lower edge of the linear diffuser plate 28 and the top surface of the floor preferably ensures that the air diffused into the enclosed space is spread close to the top surface of the floor. In one embodiment, the diffuser duct 20 preferably has a length $L_2$ of about 20-24 feet, a height $H_2$ of about 6-18 inches and a width $W_2$ of about 18-36 inches. As noted above, the relatively large dimensions of the diffuser duct 20, compared to a conventional ventilation system, provides a number of benefits, including, inter alia, reducing noise and energy costs associated with operating the system.

Referring to FIGS. 1A-1B, in one embodiment, the displacement ventilation system 10 desirably includes a vertical duct 30 having a lower end 32 and an upper end 34. In one embodiment, the lower end 32 of the vertical duct 30 is coupled with the downstream end 18 of the air inlet duct 14 and the upstream end 24 of the diffuser duct 20. As will be described in more detail below, the vertical duct 30 preferably houses a heat exchanger (FIG. 3) for transferring thermal energy between incoming air and return air, and a heat pump (FIG. 3) for heating or cooling air flowing through the system. In one embodiment, the vertical duct may house a system controller that may be engaged by an operator for controlling and operating the displacement ventilation system disclosed herein.

In one embodiment, the displacement ventilation system 10 also preferably includes a return air duct 40 having an upstream end 42 and a downstream end 44 that is coupled with the upper end 34 of the vertical duct 30. In one embodiment, the return air duct 40 preferably has a length $L_3$ of about 24-30 feet, a height $H_3$ of about 6-18 inches and a width $W_3$ of about 18-36 inches. In one embodiment, the return air duct preferably extends along a ceiling of an enclosed space.

Referring to FIG. 1A, in one embodiment, the displacement ventilation system 10 includes a return air inlet 46 that covers an opening at the upstream end of the return air duct and that enables the air adjacent a ceiling of an enclosed space to be removed from the space and passed into the upstream end 42 of the return air duct 40. In one embodiment, the return air inlet 46 may include one or more louvers (not shown) that may be opened for enabling return air to enter the return air duct 40 and closed for preventing return air from entering the return air duct 40.

Referring to FIG. 1B, in one embodiment, the displacement ventilation system 10 preferably includes a first return air outlet 50 in substantial alignment with the downstream end 44 of the return air duct 40. The first return air outlet 50 may be in fluid communication with a damper movable between open and closed positions for selectively closing the first return air outlet. In one embodiment, the damper associated with the first return air outlet is closed for directing the return air through a heat exchanger or a heat pump where it may thermally mix with incoming air. In one embodiment, the damper associated with the first return air outlet 50 may be opened for exhausting the return air through the first return air outlet and into the outside air. In one embodiment, the return air is exhausted through the first return air outlet 50 when it is desirable to cool an enclosed space by exhausting the warmer inside air and drawing cooler outside air into the enclosed space.

Referring to FIG. 1B, in one embodiment, the displacement ventilation system 10 preferably includes a second return air outlet 52 provided adjacent the lower end 32 of the vertical duct 30. In one embodiment, after return air passes through a heat exchanger for exchanging thermal energy with incoming air, the return air exits the system 10 through the second return air outlet 52. In this particular embodiment, the one or more dampers inside the displacement ventilation system are arranged so that the return air does not exit through the first return air outlet 50, but is directed through a heat exchanger that is in thermal communication with incoming air. After the return air passes through the heat exchanger for transferring thermal energy to the incoming air, the one or more dampers preferably direct the return air through the second return air outlet 52 for being exhausted to the outside.

Referring to FIG. 2, in one embodiment, the diffuser duct 20 desirably includes the downstream end 22, the upstream end 24, and an inner face 26 that extends between the downstream and upstream ends thereof. The inner surface 26 preferably defines an elongated opening that is covered by a linear diffuser plate 28. In one embodiment, the diffuser duct 20 desirably includes one or more internal partitions that are disposed between the inner face 26 and an outer surface 54 of the diffuser duct 20. In one embodiment, the one or more partition walls preferably include a first partition wall 56 and a spaced, second partition wall 58. The first partition wall 56 is preferably spaced between the inner face 26 and the outer surface 54 of the diffuser duct 20. The second partition wall 58 is preferably spaced between the first partition wall 56 and the outer surface 54 of the diffuser duct 20. The partition walls 56, 58 preferably form distinct flow channels for the air passing from the upstream end 24 to the downstream end 22 of the diffuser duct. In one embodiment, the first partition wall 56 preferably extends approximately one-third of the length of the diffuser duct. In one embodiment, the second partition wall 58 preferably extends approximately two-thirds of the length of the diffuser duct. In one embodiment, as air flows through the diffuser duct 20 toward the downstream end 22 of the diffuser duct, the partition walls 56, 58 define three distinct and separate air flow channels through the diffuser duct so that the incoming air is diffused evenly along the length of the linear diffuser 28.

Figure 3:
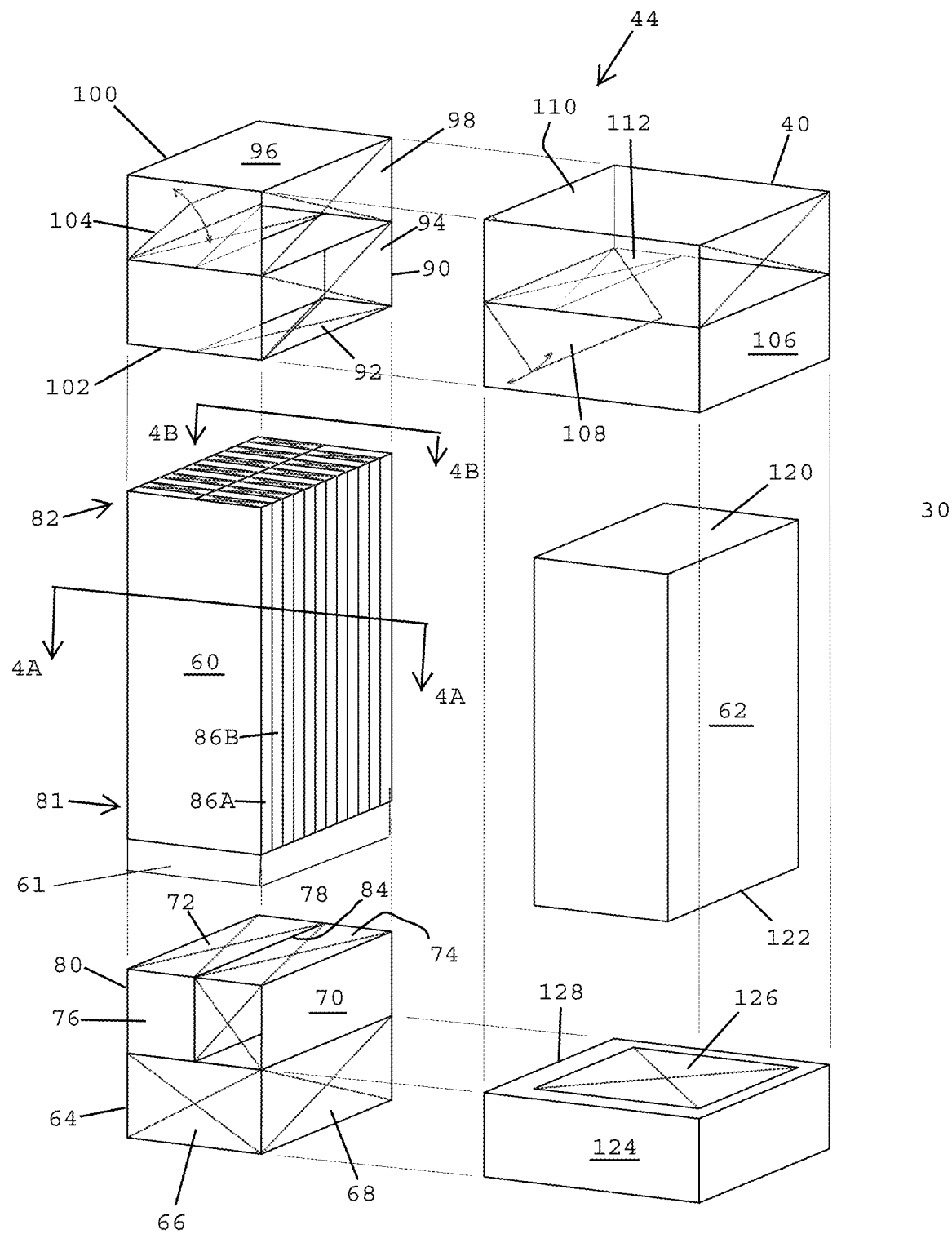
FIG. 3 shows an exploded view of a section of the displacement ventilation system shown in FIGS. 1A and 1B including a heat exchanger and a heat pump, in accordance with one embodiment of the present invention.

Referring to FIGS. 1A-1B and FIG. 3, in one embodiment, a displacement ventilation system 10 preferably includes a vertical duct 30 having a lower end 32 and an upper end 34. The vertical duct 30 preferably includes and/or is coupled with various conduits that direct air flow through the system. In one embodiment, the vertical duct 30 desirably provides fluid communication between the air inlet duct 14 and the diffuser duct 20, and desirably provides fluid communication between the return air duct 40 and the components located in the vertical duct.

FIG. 3 provides an exploded view of components of the system that are disposed within and/or coupled with the vertical duct 30, in accordance with one embodiment of the present invention. In one embodiment, the displacement ventilation system desirably includes a heat exchanger 60 and a heat pump 62 that are disposed within the vertical duct 30. In one embodiment, the displacement ventilation system preferably includes a first conduit 64 located adjacent the lower end 32 of the vertical duct 30. The first conduit 64 preferably includes a downstream opening 66 aligned with the upstream end 24 of the diffuser duct 20 (FIG. 1A), and an upstream opening 68 that is preferably in fluid communication with the downstream opening 66. In one embodiment, the first conduit 64 preferably directs the air flow in a horizontal direction and changes the direction of the air flow approximately ninety degrees to the left as it flows between the upstream opening 68 and the downstream opening 66 thereof.

The displacement ventilation system also desirably includes a second conduit 70 that is disposed within the vertical duct 30 and that overlies the first conduit 64. The second conduit 70 preferably includes an upstream opening 72 that is in fluid communication with the downstream end 18 of the air inlet duct 14. The second conduit 70 also preferably includes a downstream opening 74 that enables air exiting the second conduit to pass therethrough. In one embodiment, fresh air drawn into the system exits the downstream end 18 of the air inlet duct 14 and flows into the upstream opening 72 of the second conduit 70. The second conduit 70 desirably changes the direction of the air flow so that the air passes through the downstream opening 74. The inner surfaces of the second conduit 70 may change the direction of the air flow from a substantially horizontal flow to a substantially vertical flow. In one embodiment, the second conduit 70 preferably directs the incoming air into a lower end of a first section of the heat exchanger 60, as will be described in more detail herein.

In one embodiment, the displacement ventilation system preferably includes a third conduit 76 disposed adjacent the lower end 32 of the vertical duct 30. The third conduit 76 desirably includes an upstream opening 78 that is adapted to receive an air stream exhausted from a lower end of a heat exchanger. In one embodiment, return air that is being exhausted and/or removed from an enclosed space by a displacement ventilation system preferably passes through the upstream opening 78 and into the third conduit 76. The third conduit 76 desirably includes a downstream opening 80 adapted for being aligned with the second return air outlet 52 (FIG. 1B) for exhausting the return air from the system and into the outside air. In one embodiment, the third conduit 76 desirably alters the flow path of the return air from a substantially vertical direction to a substantially horizontal direction. In one embodiment, the system desirably includes a vertical wall 84 that extends between the second conduit 70 and the third conduit 76. In one embodiment, the vertically extending wall 84 is a porous or semi-porous material that enables vapor or humidity to be transferred between the return air and the incoming air.

In one embodiment, the displacement ventilation system preferably includes a heat exchanger 60 disposed within the vertical duct 30. In one embodiment, the heat exchanger 60 preferably has a lower end 81 and an upper end 82. In one embodiment, the displacement ventilation system may include one or more ultraviolet lights 61 that are that are designed to function as a photocatalyst to accelerate the oxidation process provided by the titanium oxide, titanium dioxide, copper oxide and/or silver oxide coatings for neutralizing pollutants, disinfecting microbes, and/or improving thermal energy transfer. In one embodiment, the one or more ultraviolet lights 61 are incorporated into and/or optically coupled with the heat exchanger 60.

Figure 4A:
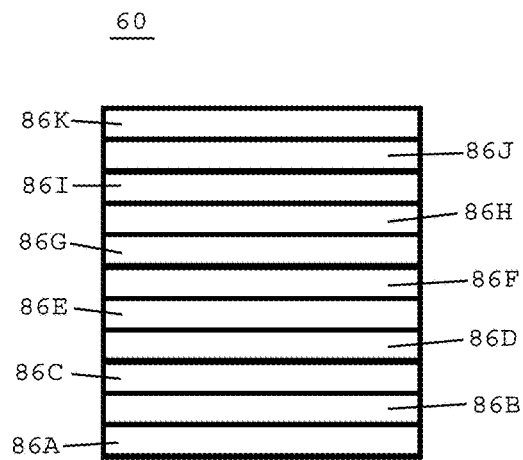
FIG. 4A shows a cross-sectional view of the heat exchanger shown in FIG. 3.

Referring to FIG. 4A, in one embodiment, the heat exchanger 60 includes a plurality of distinct cells 86A-86K that extend between the upper and lower ends thereof. In one embodiment, the heat exchanger 60 preferably includes odd-numbered cells 86A, 86C, 86E, 86G, 86I, and 86K, which are adapted to direct the flow of the incoming air between the lower end 81 and the upper end 82 of the heat exchanger. In one embodiment, the heat exchanger 60 preferably includes even-numbered cells 86B, 86D, 86F, 86H, and 86J, which are adapted to direct the flow of the return air from the upper end 82 to the lower end 81 of the heat exchanger.

Figure 4B:
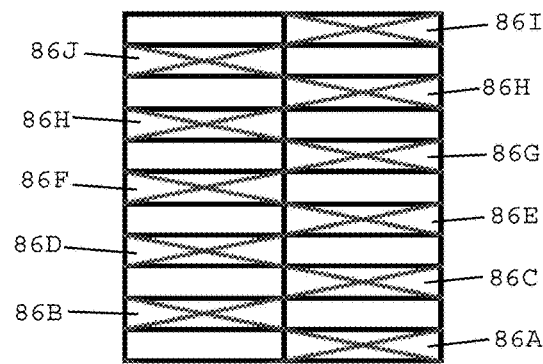
FIG. 4B shows a top plan view of the heat exchanger shown in FIG. 3.

Referring to FIG. 4B, in one embodiment, each of the odd-numbered cells 86A, 86C, 86E, 86G, 86I, and 86K is open on the right side and closed on the left side. In one embodiment, each of the even-numbered cells 86B, 86D, 86F, 86H, and 86J is open on the left side and closed on the right side.

Figure 4C:
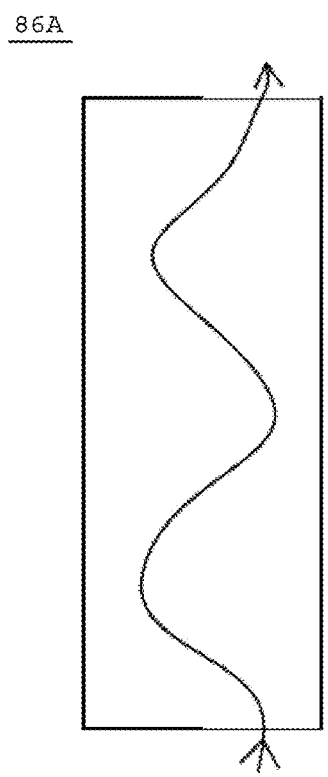
FIG. 4C shows the flow of inlet air through a first cell of the heat exchanger shown in FIG. 3.

Referring to FIG. 4C, in one embodiment, the air flow through the first odd-numbered cell 86A is shown. The incoming air enters the lower end of the cell through an inlet opening provided on the right side cell. As shown in FIG. 4C, the left side of the cell is closed. After the air stream enters the first cell 86A, the air is free to flow through the entire width of the cell 86A until it reaches the upper end whereupon the closed left side forces the air to exit the cell through an outlet opening provided on the right side of the cell.

Figure 4D:
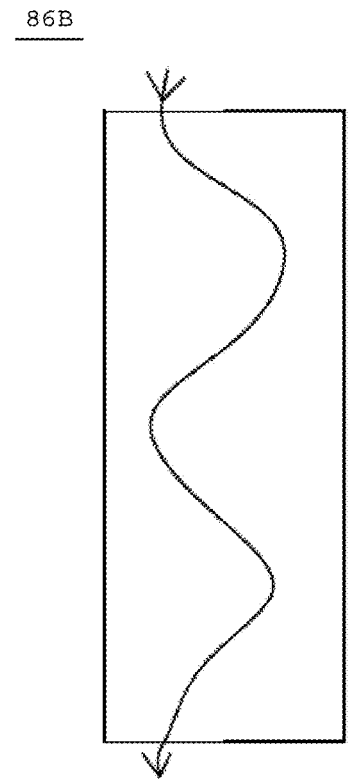
FIG. 4D shows the flow of return air through a second cell of the heat exchanger shown in FIG. 3.

FIG. 4D shows a second, even-numbered cell 86B having the inlet opening and the outlet opening on the left side of the cell, with the right side of the cell 86B being closed at the respective upper and lower ends. In one embodiment, return air enters the inlet opening on the left side of the cell, whereupon is it free to flow through the entire width of the cell 86B, and is then forced back to the left side of the cell for exiting through the outlet opening. Although the present invention is not limited by any particular theory of operation, it is believed that the heat exchanger 60 shown in FIGS. 3 and 4A-4D enhances thermal communication between the incoming air and the return air so as to maximize heat exchange between the two air flows.

In one embodiment, the incoming air desirably flows upwardly through the odd-numbered cells 86A, 86C, 86E, 86G, 86I, and 86K of the heat exchanger 60, and the return air flows downwardly through the even-numbered cells 86B, 86D, 86F, 86H, and 86J of the heat exchanger 60 for transferring thermal energy between the incoming air and the return air. In one embodiment, a temperature differential may exist between the incoming air and the return air. The heat exchanger may transfer thermal energy between the incoming air and the return air for optimizing the performance of the displacement ventilation system. In one embodiment, the return air may be warmer than the incoming air and the heat exchanger may transfer heat from the return air to the incoming air for warming the incoming air.

Referring to FIG. 3, in one embodiment, the displacement ventilation system preferably includes a fourth conduit 90 that is located adjacent the upper end 34 of the vertical duct 30. In one embodiment, after the incoming air exits the odd-numbered cells 86A, 86C, 86E, etc. of the heat exchanger 60, the fourth conduit 90 preferably changes the direction of the incoming air to direct the flow path of the incoming air through the heat pump 62. In one embodiment, the fourth conduit 90 preferably directs the flow path of the incoming air between the odd-numbered cells of the heat exchanger 60 and an inlet 120 of the heat pump 62. In one embodiment, the fourth conduit 90 preferably includes an upstream opening 92 aligned with the odd-numbered cells of the heat exchanger 60 and a downstream opening 94 aligned with an opening in an adjacent conduit, as will be described in more detail below.

In one embodiment, a displacement ventilation system preferably includes a fifth conduit 96 that provides an air flow pathway between the downstream end 44 of the return air duct 40 and the second section 88 of the heat exchanger 60 and/or the first return air outlet 50. The fifth conduit 96 preferably includes an upstream opening 98 aligned with the downstream end 44 of the return air duct 40, a first downstream opening 100 aligned with the first return air outlet 50 (FIG. 1B), and a second downstream opening 102 that is in alignment with the second section 88 of the heat exchanger 60. The fifth conduit 96 also preferably includes a damper 104 movable between a first position for closing the first downstream opening 100 for directing the return air through the second downstream opening 102 and into the second section 88 of the heat exchanger 60, and a second damper position for opening the first downstream opening 100 for exhausting the return air through the first air outlet 50 and into the outside air.

As used herein, the terminology "heat pump" means any component that may be used to heat or warm air. In one embodiment, the heat pump may be a gas furnace. In one embodiment, the heat pump may include heat pump coils and/or a hydronic system for adjusting air temperature. As used herein, the terminology "heat pump" may include any component utilized to adjust air temperature whether the air temperature is maintained, adjusted upwardly, or adjusted downwardly.

In one embodiment, the displacement ventilation system preferably includes a sixth conduit 106 adapted to receive incoming air from the fourth conduit and to direct the air into the inlet 120 of the heat pump 62. In one embodiment, the sixth conduit 106 desirably includes a damper 108 that is movable for directing at least some of the return air into the heat pump 62.

In one embodiment, the downstream end 44 of the return air duct 40 desirably includes a downstream opening 110 that is aligned with the upstream opening 98 of the fifth conduit 96. The second damper 108 may be rotated upwardly for closing the downstream opening 110 so as to direct at least some of the return air into the heat pump 62. In one embodiment, the second damper 108 may be rotated downward for directing at least some of the return air into the fifth conduit 96 and some of the return air through the heat pump 62.

In one embodiment, the displacement ventilation system preferably includes the heat pump 62 disposed within the vertical duct 30. The heat pump 62 preferably has an inlet end 120 in communication with the sixth conduit 106 and an outlet end 122 adjacent the lower end thereof. In one embodiment, air enters the inlet end 120 of the heat pump 62 for being heated or cooled and is discharged from the outlet end 122 of the heat pump 62.

In one embodiment, the displacement ventilation system preferably includes a seventh conduit 124 located adjacent a lower end of the vertical duct 30. In one embodiment, the seventh conduit 124 preferably has an upstream opening 126 aligned with the outlet end 122 of the heat pump 62 and a downstream opening 128 aligned with the upstream opening 68 of the first conduit 64. The seventh conduit 124 preferably changes the flow direction of the air discharged from the outlet end 122 of the heat pump 62, and directs the air into the upstream opening 68 of the first conduit 64, which, in turn, directs the air through the downstream opening 66 of the first conduit 64 and into the diffuser duct 20. In one embodiment, the seventh conduit 124 preferably changes the direction of the air flow from a substantially vertical direction to a substantially horizontal direction.

Referring to FIGS. 1A-1B and 3, in one embodiment, outside air is drawn through the air inlet 12 and travels toward the downstream end 18 of the air inlet duct 14. The outside air is then directed into the upstream opening 72 of the second conduit 70. The second conduit 70 preferably changes the flow path of the incoming air from a substantially horizontal direction to a substantially vertical direction. The incoming air desirably passes through the downstream opening 74 of the second conduit 70 and into the inlet openings at the lower ends of the odd-numbered cells of the heat exchanger 60. The incoming air then desirably travels downstream through the heat exchanger 60 until it is dispensed from the upper end of the first section 86 of the heat exchanger. As the air flows through the odd-numbered cells of the heat exchanger 60, the incoming air may exchange thermal energy with return air flowing through the even-numbered cells of the heat exchanger 60. After the air is discharged from the outlet openings at the upper ends of the odd-numbered cells of the heat exchanger 60, the air preferably passes through the upstream opening 92 of the fourth conduit 90. The fourth conduit 90 desirably changes the flow path of the incoming air from a substantially vertical direction to a substantially horizontal direction, and the air exits the fourth conduit through downstream opening 94. The air preferably passes from downstream opening 94 into the sixth conduit 106, which, in turn, directs the incoming air into the inlet end 120 of the heat pump 62. The temperature of the incoming air may be changed by the heat pump 62, if necessary, and then dispensed from the outlet end 122 of the heat pump 62.

In one embodiment, the air discharged from the outlet end 122 of the heat pump 62 is preferably directed into the upstream opening 126 of the seventh conduit 124. The seventh conduit preferably changes the flow path of the air from a substantially vertical direction to a substantially horizontal direction. The air preferably leaves the seventh conduit 124 through the downstream opening 128 and passes into the upstream opening 68 of the first conduit 64. In one embodiment, the first conduit 64 desirably changes the flow path of the air stream by turning the flow path to the left (within a horizontal plane) for being dispensed from downstream opening 66 of the first conduit. In one embodiment, the downstream opening 66 of the first conduit 64 is preferably coupled with the upstream end 24 of the diffuser duct 20 shown in FIG. 1A and FIG. 2. The air preferably flows toward the downstream end 22 of the diffuser duct 20 for being diffused through the linear diffuser plate 28 (FIG. 1A) of the diffuser duct 14. Referring to FIG. 2, the partition walls 56, 58 located inside the diffuser duct insure that the diffused air is evenly dispersed along the length of the diffuser duct 20.

In one embodiment, air located adjacent the ceiling may be drawn into the return air inlet 46 of the return air duct 40 for exhausting the air from an enclosed space. After the return air enters the return air duct, the return air preferably travels from the upstream end 42 of the return air duct toward the downstream end 44 of the return air duct 40. Referring to FIGS. 1A and 3, in one embodiment, the position of the second damper 108 may control the flow of the return air and the incoming air. If the second damper 108 is rotated into a vertical orientation, the return air is preferably directed through opening 112 and into the inlet end 120 of the heat pump 62. If it is desirable to at least partially exhaust some of the return air, or direct the return air through the heat exchanger 60, the second damper 108 is desirably rotated into a horizontal position for closing opening 112. Depending upon the exact positioning of the second damper 108, the return air may be discharged from the first air outlet 50 adjacent the downstream end 44 of the return air duct 40, may be directed through the heat pump 62, and/or may be directed through the even-numbered cells of the heat exchanger 60 for transferring thermal energy between the return air and the incoming air. In one embodiment, after the return air passes downstream and is discharged from the lower end 81 of the heat exchanger 60, it may pass through the upstream opening 78 of the third conduit 76 for being discharged from the downstream opening 80 that is preferably in alignment with the second air outlet 52.

In one embodiment, the first damper 104 within the fifth conduit 96 may be in a substantially vertical position for closing the first air outlet 50 and directing at least some of the return air in the fifth conduit 96 into the even-numbered cells of the heat exchanger 60. In one embodiment, the first damper 104 may be positioned in a horizontal configuration for directing at least some of the return air through the first return air outlet 50 for being exhausted to the outside of the system. In one embodiment, the first damper 104 may be positioned between a vertical orientation and a horizontal orientation for directing at least some of the return air through the first return air outlet 50 for being exhausted from the system and directing at least some of the return air through the heat exchanger for transmitting thermal energy to the incoming air.

In one embodiment, the second damper 108 may be in a substantially vertical configuration for directing at least some of the return air into the inlet end 120 of the heat pump 62. The second damper 108 may be positioned at a location between a vertical and a horizontal orientation for enabling at least some of the return air to pass into the fifth conduit 96 for being exhausted to the outside of the system and/or for being directed through the heat exchanger.

Figure 5A:
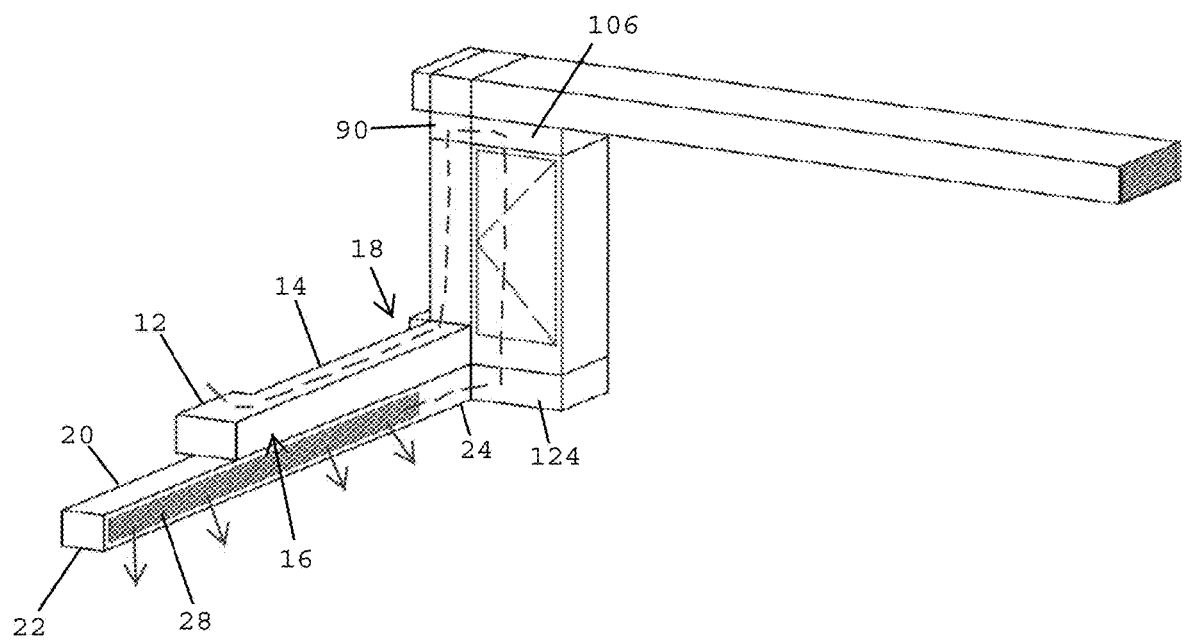
FIGS. 5A and 5B show a flow path for incoming air passing through the displacement ventilation system of FIGS. 1A and 1B, in accordance with one embodiment of the present invention.
Figure 5B:
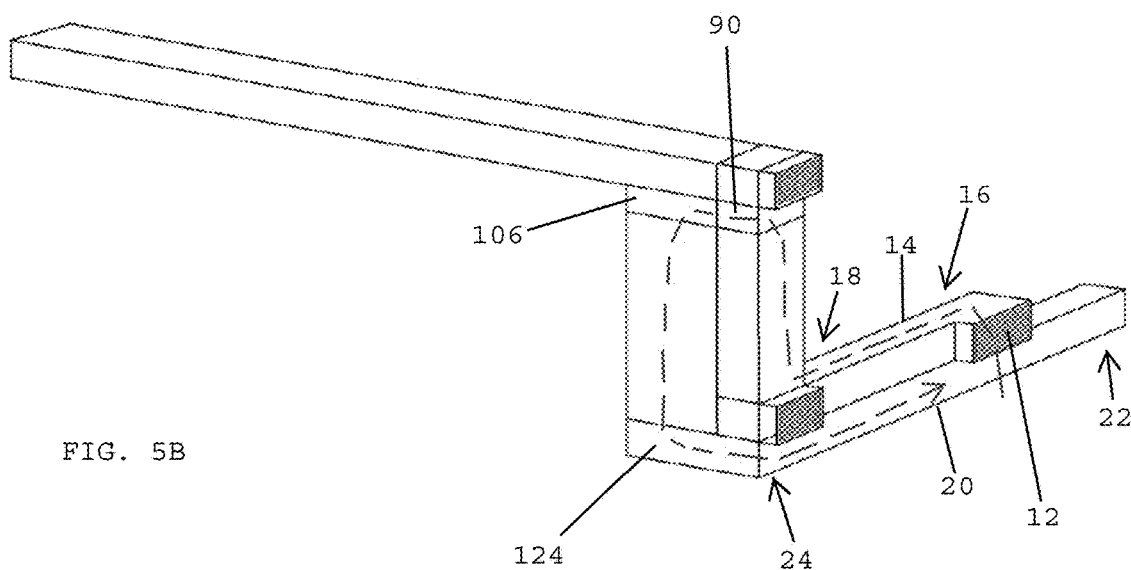

Referring to FIGS. 5A and 5B, in one embodiment, outside air is drawn through the air inlet 12 adjacent the upstream end 16 of the air inlet duct 14 and passes downstream toward the downstream end 18 of the air inlet duct 14. The outside air is preferably directed through the second conduit 70 and into the first section of the heat exchanger 60 shown in FIG. 3. As the incoming air passes upwardly through the odd-numbered cells of the heat exchanger 60, thermal energy may be transferred between the incoming air and the return air. After the incoming air exits the downstream end of the odd-numbered cells of the heat exchanger 60, it is preferably directed through the fourth conduit 90, through the sixth conduit 106, and into the inlet end 120 of the heat pump 62. The temperature of the air stream may be modified (e.g., heated or cooled) as it passes through the heat pump 62. In one embodiment, the air stream is heated. In one embodiment, the air stream is cooled. After the air passes through the heat pump 62, the air is preferably dispensed from the outlet end 122 of the heat pump 62 and directed through the seventh conduit 124, through the first conduit 64, and into the upstream end 24 of the diffuser duct 20. As the air stream moves from the upstream end 24 toward the downstream end 22 of the diffuser duct 20, the air is preferably diffused through the openings in the linear diffuser plate 28. The diffused air passing from the linear diffuser plate 28 preferably spreads in a substantially horizontal direction over the floor surface. The relatively large dimensions associated with the diffuser duct and the linear diffuser plate 28 desirably enables the air to be diffused at a low velocity, which minimizes the amount of noise generated by the displacement ventilation system. As the diffused air contacts occupants and equipment located in an enclosed space, the air is preferably heated and rises toward the ceiling.

Figure 6A:
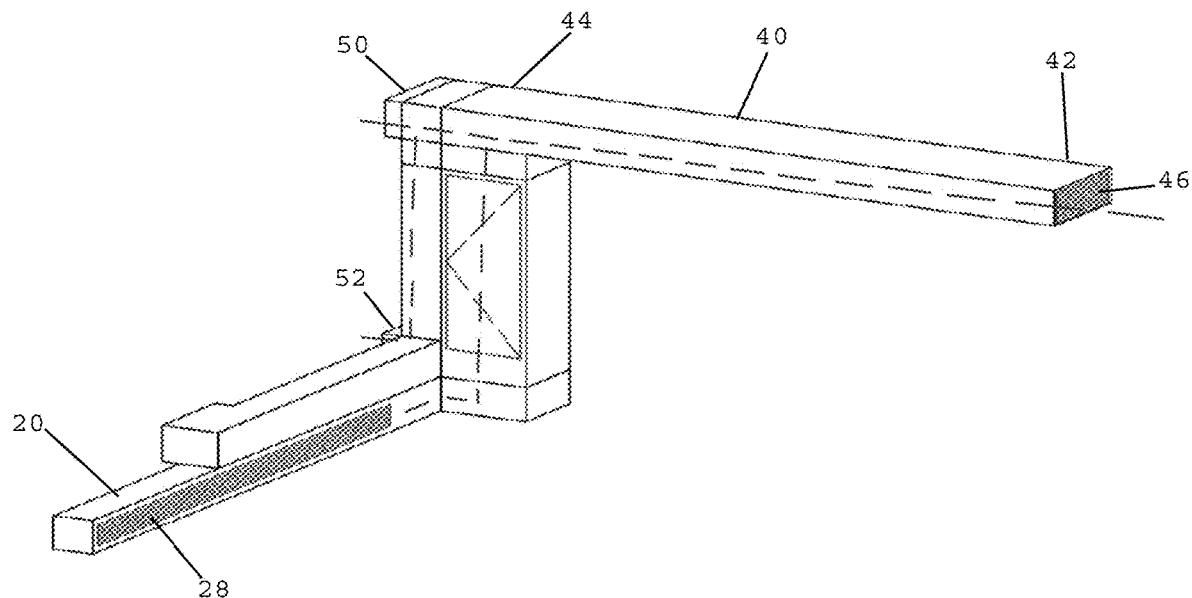
FIGS. 6A and 6B show a flow path for return air passing through the displacement ventilation system of FIGS. 1A and 1B, in accordance with one embodiment of the present invention.
Figure 6B:
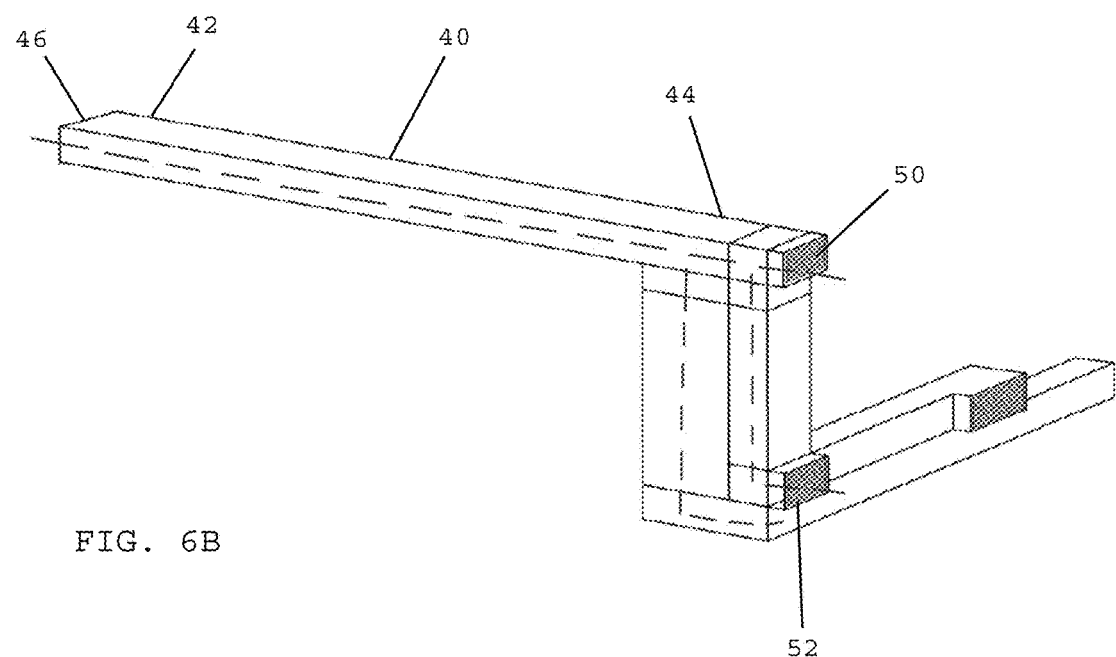

Referring to FIGS. 6A and 6B, in one embodiment, any pollution in the air around the occupants and equipment is preferably carried by the air as the air rises toward the ceiling. The air adjacent the ceiling may be drawn through the return air inlet 46 for passing from the upstream end 42 toward the downstream end 44 of the return air duct 40. In one embodiment, the dampers 104, 108 (FIG. 3) are preferably positioned so that all or most of the return air is exhausted from the system through the first return air outlet 50. In one embodiment, the dampers may be positioned so that most or all of the return air is directed through the heat pump 62 (FIG. 3) for mixing with the incoming air. In one embodiment, the dampers may be positioned so that a portion of the return air is exhausted from the system through the first return air outlet 50 and a portion is directed through the heat exchanger and/or the heat pump for mixing with the incoming air. In one embodiment, after the return air has passed through the second section of the heat exchanger 60, it may be exhausted from the system through the second return air outlet 52. In one embodiment, after the return air has passed through the heat pump 62, it may be directed back into a room or enclosed space via the linear diffuser plate 28 of the diffuser duct 20.

In one embodiment, the system may include one or more dividing walls having a permeable or semi-permeable membrane that enables moisture to pass between the incoming air and the return air. Although the present invention is not limited by any particular theory of operation, it is believed that providing one or more dividing walls having a permeable or semi-permeable membrane may enable latent heat present in the moisture in the incoming air and/or return to pass from one air stream to the other air stream. In one embodiment, the displacement ventilation system may have other permeable or semi-permeable membranes positioned throughout the system that separate the incoming air and the return air streams for passing moisture between the two different air streams.

Figure 7:
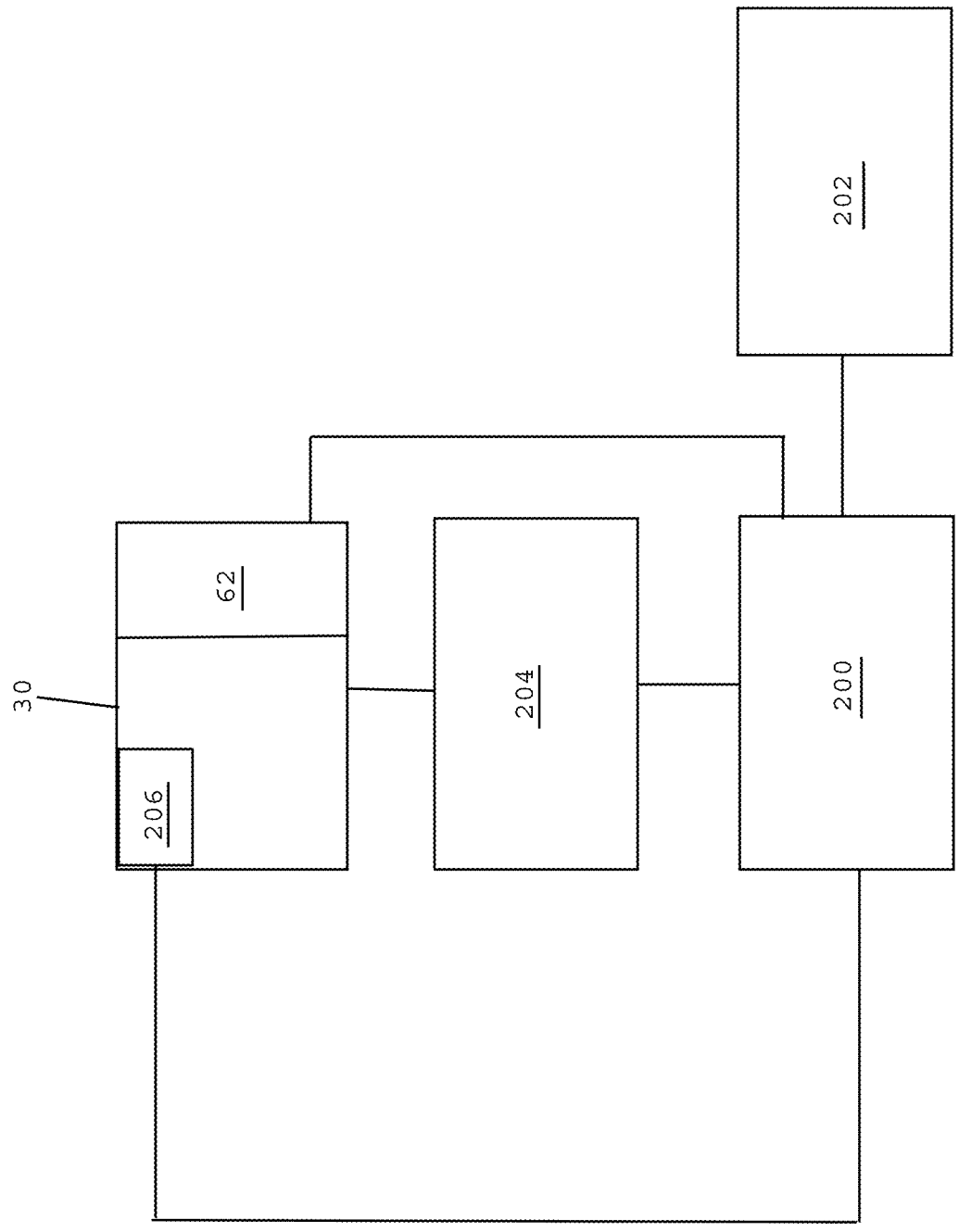
FIG. 7 shows a schematic view of a displacement ventilation system including a controller, a sensor and dampers, in accordance with one embodiment of the present invention.

Referring to FIG. 7, in one embodiment, a displacement ventilation system 10 includes a vertical duct 30 having a heat pump 62 disposed therein. The displacement ventilation system 10 includes a system controller 200 that preferably has one or more central processing units having one or more operating systems programmed therein. The displacement ventilation system 10 preferably includes one or more sensors 202 that are in communication with the system controller 200. The one or more sensors 202 may include temperature sensors, humidity sensors, air quality sensors, and/or motion detection sensors. The sensors 202 may be in communication with the system controller 200 via communication lines or radio signals. In one embodiment, the system controller may activate the system if the temperature is too high, too low, or the air quality is poor. In one embodiment, the controller 200 may activate the system upon detecting the presence of an occupant in an enclosed space.

In one embodiment, the displacement ventilation system 10 includes a compressor or fan system 204 for driving the air through the system. The system controller 200 preferably activates and operates the fans and/or compressor when required for ventilating, heating and/or cooling an enclosed space.

In one embodiment, the system controller 200 is preferably in communication with a damper/louver system 206 that selectively moves dampers and/or opens and closes louvers in communication with the air inlet duct, the diffuser duct, the return air duct, the air inlet, and the return air outlets described above. In one embodiment, the system controller 200 may preferably open and close louvers for drawing air into and/or exhausting air from the system. The system controller 200 also preferably controls the positioning of dampers located inside the system for controlling and directing air flow through the system.

Figure 8:
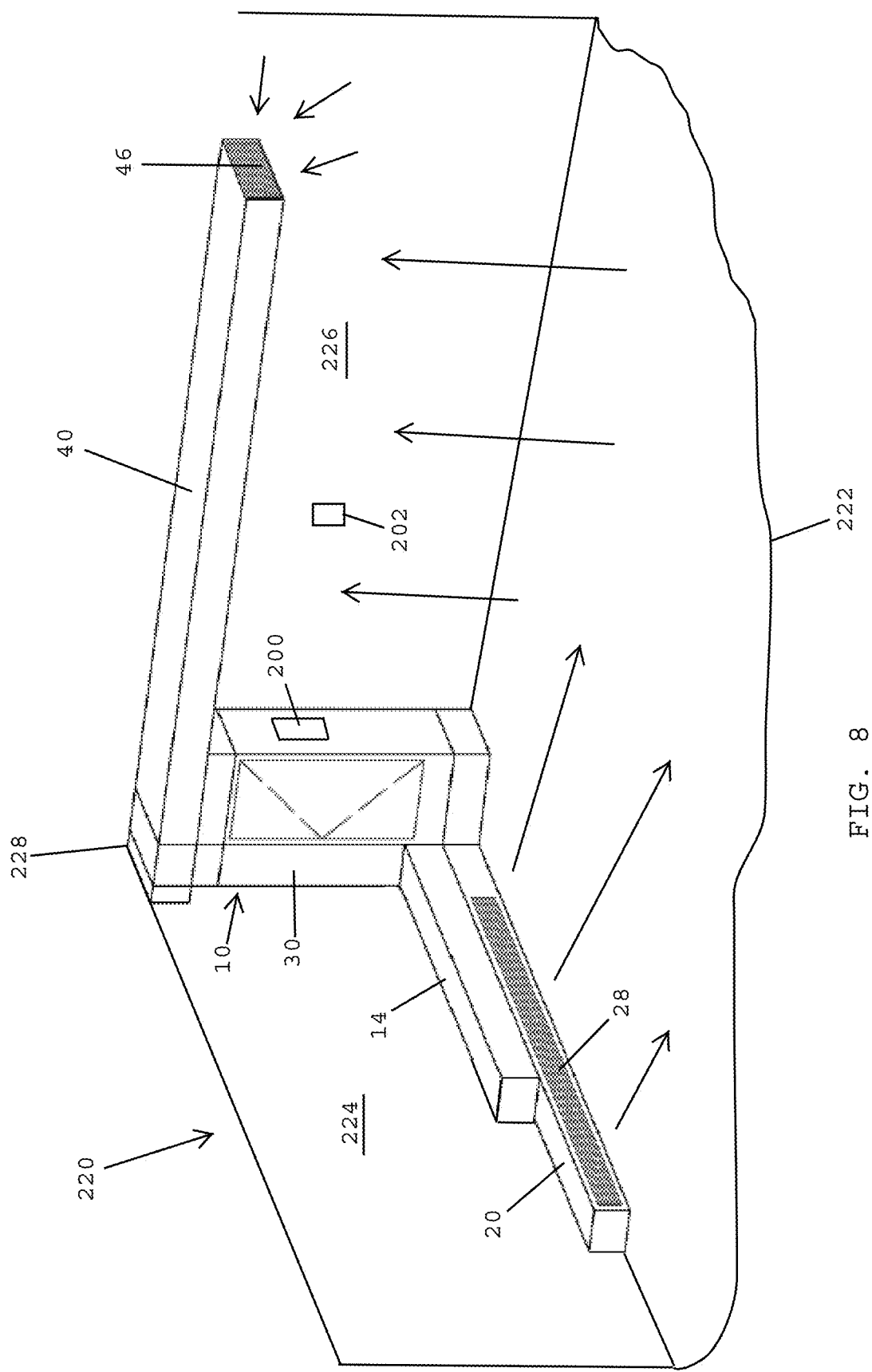
FIG. 8 shows a displacement ventilation system installed in an enclosed space, in accordance with one embodiment of the present invention.

Referring to FIG. 8, in one embodiment, a displacement ventilation system 10 is disposed within an enclosed space 220 including a floor 222, a first wall 224 and a second wall 226. In one embodiment, the vertical duct 30 of the displacement ventilation system is positioned in a corner 228 of the enclosed space 220 with the air inlet duct 14 and diffuser duct 20 extending along the first wall 224 and the air return duct 20 extending along the second wall 226, adjacent the ceiling of the enclosed space. As shown in FIG. 8, the diffuser duct 20 is preferably positioned at the lower end of the first wall 224, adjacent the top surface of the floor 222 so that the elongated diffuser plate 28 diffuses air directly over the top surface of the floor 222. The return air duct 40 is preferably positioned adjacent the upper ends of the first and second walls 224, 226. In one embodiment, the return air duct 40 is preferably positioned adjacent the ceiling of the enclosed space for removing air from the enclosed space 220.

In one embodiment, the control system 200 preferably includes a control panel accessible on the vertical duct 30. The control system 200 is preferably in communication with sensor(s) 202 that may be positioned on one or more of the walls 224, 226. In one embodiment, the displacement ventilation system 10 may include more than one sensor 202. In one embodiment, the air diffused through the linear diffusion plate 28 preferably diffuses over the top surface of the floor 222. As the air picks up heat from occupants and objects located within the enclosed space 220, the air preferably rises in vertical plumes toward the ceiling. The air adjacent the ceiling may be drawn through the return air inlet 46 for being removed from the enclosed space 220 via the return air duct 40.

In one embodiment, the heat exchanger may include a thin coating that removes pollutants from the air flow. Preferred coatings may include titanium dioxide, cooper oxide, and/or silver oxide. In one embodiment, one of the first and second sections of the heat exchanger may have a black or darker coating and the other of the first and second sections of the heat exchanger may have a white or lighter coating for enhancing the heat exchange properties of the heat exchanger.

In one embodiment, the displacement ventilation system preferably includes one or more ultraviolet lights that are designed to function as a photocatalyst to accelerate the oxidation process of the titanium dioxide, copper oxide, and/or silver oxide coatings for neutralizing pollutants, removing pollutants, disinfecting microbes, and/or improving thermal energy transfer.

In one embodiment, the heat exchanger preferably includes one or more ultraviolet lights that are adapted to accelerate the oxidation process for decomposing any air borne pollutants or toxic matter present in at least one of said first and second flow paths.

In one embodiment, one or more of the elongated ducts may be lined with an acoustical liner for minimizing noise. In one embodiment, the acoustical liner may include a black fiberglass liner for reducing noise as the air flows through the displacement ventilation system.

The present application discloses a various preferred embodiments of a displacement ventilation system. Although particular configurations are shown, other configurations may be utilized and still fall within the scope of the present application. For example, the particular arrangement of the heat exchanger and the heat pump within the vertical duct 30 may be modified and still fall within the scope of the present invention. For example, referring to FIG. 8, in one embodiment, both the heat exchanger and the heat pump located within the vertical duct 30 may be adjacent the first outer wall 224.

Although the present invention is not limited by any particular theory of operation, it is noted that the air flow through the system must change direction in a series of turns, such as 90° turns. It is believed that providing a system having many 90° turns minimizes noise transmission.

In one embodiment, the linear diffuser may be located in the "toe kick" area of a cabinet or a bookcase. As such, a cabinet or bookcase may be built around or placed over the displacement ventilation system with the linear diffuser located at the base or bottom of the cabinet or bookcase.

In one embodiment, the displacement ventilation system may include one or more access doors for cleaning and maintaining the various components of the system. In one embodiment, at least one access door is associated with the vertical duct for providing access to the heat pump and/or the heat exchanger.

In one embodiment, the length, height, and width of the ducts are substantially larger than found in conventional systems. The larger dimensions of the ducts preferably make the system more energy efficient as the flow of the air through the system overcomes less friction, which minimizes energy needs.

In one embodiment, the displacement ventilation system may include one or more permeable or semi-permeable membranes that allow for vapor transfer to occur between the incoming air and the return air. The permeable or semi-permeable membranes preferably enable the moisture in the air to be transferred between the opposite air flows for transferring latent energy therebetween. In one embodiment, the return air may have a greater moisture content than the incoming air and the permeable or semi-permeable membranes may transfer moisture between the return air and the incoming air (e.g. within the heat exchanger). The permeable or semi-permeable membranes may enhance the efficiency of heat transfer.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A displacement ventilation system for a room comprising:

said room having a floor; a ceiling, a first wall extending from the floor to the ceiling, a second wall extending from the floor to the ceiling, and a corner located at the intersection of the first and second walls, the corner extending from the floor to the ceiling;

a first duct located inside said room and being positioned against the first wall of said room;

an air inlet coupled with said first duct for drawing fresh, outside air into said displacement ventilation system;

an elongated diffuser extending along the first wall adjacent the floor of said room and being coupled with said first duct for diffusing at least some of the fresh; outside air over the floor of said room; wherein said elongated diffuser has a length that extends horizontally over a top surface of the floor of said room;

a return air duct extending along the second wall adjacent the ceiling of said room and being coupled with said first duct for removing return air located near the ceiling from said room and advancing the return air toward said first duct, wherein said elongated diffuser introduces the fresh air into said room at the floor of said room and said return air duct removes the return air from said room at the ceiling of said room to create a floor to ceiling air flow pattern within said room;

a heat exchanger located between said air inlet and said return air duct for transferring thermal energy between the return air and the fresh, outside air;

a heat pump located between said air inlet and said elongated diffuser for changing a temperature level of the fresh, outside air or the return air passing through said heat pump;

one or more sensors located inside said room;

a controller for controlling operation of said displacement ventilation system, wherein said controller is in communication with said one or more sensors;

a variable speed fan for driving air through said displacement ventilation system, wherein said controller is coupled with said variable speed fan and said heat pump for controlling operation of said displacement ventilation system;

an air inlet duct having an upstream end and a downstream end, wherein said air inlet is connected to the upstream end of said air inlet duct and the downstream end of said air inlet duct is coupled with said first duct;

wherein said elongated diffuser comprises a diffuser duct having an upstream end coupled with said first duct, a downstream end remote from the upstream end, an outer surface extending along the length of said diffuser duct, and an inner face extending along the length of said diffuser duct, said inner face including a horizontally-extending, elongated porous diffusion plate having a plurality of openings adapted for diffusing said air over the floor of said room;

wherein said diffuser duct comprises a first partition wall located between said porous inner face and said outer surface of said diffuser duct that extends one-third of the length of said diffuser duct; and a second partition wall located between said first partition wall and said outer surface of said diffuser duct that extends two-thirds of the length of said diffuser duct, wherein said first and second partition walls define three distinct and separate air flow channels extending along the length of said diffuser duct so that the fresh air is diffused evenly from said horizontally-extending, elongated porous diffusion plate along the length of said diffuser duct.

2. The displacement ventilation system as claimed in claim 1, wherein said one or more sensors are selected from the group of sensors consisting of temperature sensors, humidity sensors, air quality sensors, and motion detection sensors.

3. The displacement ventilation system as claimed in claim 1, wherein said one or more sensors comprise one or more air quality sensors, and wherein said system controller is configured to activate said displacement ventilation system upon receiving predetermined signals from said one or more air quality sensors.

4. The displacement ventilation system as claimed in claim 1, wherein said one or more sensors comprise one or more motion detection sensors, and wherein said system controller is configured to activate said displacement ventilation system if said one or more motion detection sensors detect the presence of an occupant inside said room.

5. The displacement ventilation system as claimed in claim 1, wherein said air inlet duct has a length of 12-18 feet, a height of 6-18 inches, and a width of 18-36 inches.

6. The displacement ventilation system as claimed in claim 1, wherein said diffuser duct has a length of 20-24 feet, a height of 6-18 inches, and a width of 18-36 inches.

7. The displacement ventilation system as claimed in claim 1, wherein said horizontally-extending, elongated porous diffusion plate of said diffuser duct has a length of 18-22 feet.

8. The displacement ventilation system as claimed in claim 1, wherein said diffuser duct overlies the floor of said room and said air inlet duct overlies said diffuser duct.

9. The displacement ventilation device as claimed in claim 1, wherein said return air duct comprises an upstream end including a return air inlet for drawing the return air into said return air duct, and a downstream end overlying said first duct.

10. The displacement ventilation system as claimed in claim 9, further comprising a first return air outlet aligned with the downstream end of said return air duct for exhausting the return air from said room.

11. The displacement ventilation system as claimed in claim 10, further comprising a second return air outlet positioned adjacent a lower end of said first duct for exhausting the return air from said room after the return air has passed through said heat exchanger.

12. The displacement ventilation system as claimed in claim 1, further comprising a damper system including a plurality of moveable dampers for directing the flow of the fresh, outside air and the return air through said displacement ventilation system.

13. The displacement ventilation system as claimed in claim 12, wherein said damper system comprises:

a first state in which said dampers direct the fresh, outside air through said heat exchanger and said heat pump for being diffused across the floor of said enclosed space, and said dampers direct the return air through a first return air outlet for exhausting the return air from said system;

a second state in which said dampers direct the fresh, outside air through a first section of said heat exchanger and the return air through a second section of said heat exchanger for transferring thermal energy between the fresh, outside air and the return air and for exhausting the return air to the outside through a second return air outlet; and a third state in which said dampers direct the fresh, outside air through a first section of said heat exchanger and said heat pump, and the return air through said heat pump for mixing with the fresh, outside air.

14. The displacement ventilation system as claimed in claim 1, wherein said heat exchanger has a first flow path extending therethrough having a titanium dioxide coating for neutralizing pollutants and a second flow path extending therethough having a copper oxide coating for disinfecting microbes and improving thermal energy transfer.

15. The displacement ventilation system as claimed in claim 14, wherein said heat exchanger further comprises one or more ultraviolet lights that are adapted to accelerate the oxidation process for decomposing any air borne pollutants or toxic matter present in at least one of said first and second flow paths.

16. The displacement ventilation system as claimed in claim 14, wherein air flow through said system is adjustable so that the fresh, outside air is directable into one of said first and second flow paths depending upon outside air temperatures with the return air being directed into the other one of said first and second flow paths.

17. The displacement ventilation system as claimed in claim 1, wherein at least one of said ducts is lined with an acoustic liner for minimizing noise transmission.

18. The displacement ventilation system as claimed in claim 1, wherein said air inlet includes a louver moveable between an open position and a closed position for controlling the flow of the fresh, outside air into said displacement control system.

19. The displacement ventilation system as claimed in claim 1, wherein said heat exchanger comprises:
   a plurality of outside aft cells extending through said heat exchanger for directing the fresh, outside air from a first end to a second end of said heat exchanger, wherein each of said outside air cells has an inlet adjacent said first end of said heat exchanger and an outlet adjacent said second end of said heat exchanger; and
   a plurality of return air cells extending through said heat exchanger for directing the return air from said second end to said first end of said heat exchanger, wherein each of said return air cells has an inlet adjacent said second end of said heat exchanger and an outlet adjacent said first end of said heat exchanger, and wherein at least some of said outside air cells extending through said heat exchanger are in thermal communication with at least some of said return air cells extending through said heat exchanger for transferring thermal energy between the fresh, outside air and the return air.

20. The displacement ventilation system as claimed in claim 19, wherein at least one of said outside air cells is sandwiched between at least two of said return air cells, and wherein at least one of said return air cells is sandwiched between at least two of said outside air cells.

21. A displacement ventilation system for a room comprising:
   said room having a floor, a ceiling, a first wall extending from the floor to the ceiling, a second wall extending from the floor to the ceiling, and a corner located at the intersection of the first and second walls, the corner extending from the floor to the ceiling;
   a first duct located inside said room and being positioned against the first wall of said room;
   an air inlet coupled with said first duct for drawing fresh, outside air into said displacement ventilation system;
   an elongated diffuser extending along the first wall adjacent the floor of said room and being coupled with said first duct for diffusing at least some of the fresh, outside air over the floor of said room;
   a return air duct extending along the second wall adjacent the ceiling of said room and being coupled with said first duct for removing return air located near the ceiling from said room and advancing the return air toward said first duct;
   a heat exchanger located between said air inlet and said return air duct for transferring thermal energy between the return air and the fresh, outside air;
   a heat pump located between said air inlet and said elongated diffuser for changing a temperature level of the fresh, outside air or the return air passing through said heat pump;
   one or more sensors located inside said room;
   a controller for controlling operation of said displacement ventilation system, wherein said controller is in communication with said one or more sensors;
   an air inlet duct having an upstream end and a downstream end, wherein said air inlet is connected to the upstream end of said air inlet duct and the downstream end of said air inlet duct is coupled with said first duct;
   wherein said elongated diffuser comprises a diffuser duct having an upstream end coupled with said first duct, a downstream end remote from the upstream end, an outer surface extending along the length of said diffuser duct, and an inner face extending along the length of said diffuser duct, said inner face including a horizontally-extending, elongated porous diffusion plate having a plurality of openings adapted for diffusing said air over the floor of said room;
   wherein said diffuser duct comprises a first partition wall located between said porous inner face and said outer surface of said diffuser duct that extends one-third of the length of said diffuser duct, and a second partition wall located between said first partition wall and said outer surface of said diffuser duct that extends two-thirds of the length of said diffuser duct, wherein said first and second partition walls define three distinct and separate air flow channels extending along the length of said diffuser duct so that the fresh air is diffused evenly from said horizontally-extending, elongated porous diffusion plate along the length of said diffuser duct.

* * * * *